(12) United States Patent
Morgan et al.

(10) Patent No.: US 7,512,493 B2
(45) Date of Patent: Mar. 31, 2009

(54) HIGH SPEED GYROCOMPASS ALIGNMENT VIA MULTIPLE KALMAN FILTER BASED HYPOTHESIS TESTING

(75) Inventors: Kenneth S. Morgan, St. Petersburg, FL (US); I. Clay Thompson, Jr., Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 415 days.

(21) Appl. No.: 11/421,337

(22) Filed: May 31, 2006

(65) Prior Publication Data

US 2007/0282528 A1  Dec. 6, 2007

(51) Int. Cl.
*G01C 21/00* (2006.01)
(52) U.S. Cl. ............... 701/214; 701/200; 701/207; 701/224; 342/357.14
(58) Field of Classification Search ............ 701/200, 701/207, 214, 220, 221, 224, 225; 342/357.04, 342/357.14
See application file for complete search history.

(56) References Cited

U.S. PATENT DOCUMENTS

| 4,303,978 | A | 12/1981 | Shaw et al. | |
| 6,522,266 | B1 * | 2/2003 | Soehren et al. | ............ 340/988 |
| 2002/0120400 | A1 | 8/2002 | Lin | |

FOREIGN PATENT DOCUMENTS

EP   1760431   3/2007

OTHER PUBLICATIONS

Chuanbin et al., "A Novel Method Improving the Alignment Accuracy of a Strapdown Inertial Navigation System on a Stationary Base", "Measurement Science and Technology", 2004, pp. 765-769, vol. 15, Publisher: Institute of Physics Publishing, Published in: UK.
Gao et al., "Application of Nonlineear Filtering for Sins Initial Alignment", "Proceddings of the 2006 IEEE International Conferene on Mechatronics and Automation", 2006, pp. 2259-2263, Publisher: IEEE.
Rogers, "IMU In-Motion Alignment Without Benefit of Attitude Initialization", "Navigation and Positioning in the Information Age", Jan. 14-16, 1997, pp. 945-954, Publisher: ION 1997 National Technical Meeting.

* cited by examiner

*Primary Examiner*—Gertrude Arthur Jeanglaud
(74) *Attorney, Agent, or Firm*—Black Lowe & Graham PLLC

(57) ABSTRACT

A method of aligning a gyro-compass comprising operating at least two Kalman filters in a set of Kalman filters to generate an error correction to at least a single navigation solution in a set of navigation solutions in order to provide coarse alignment azimuth convergence. The method further comprises selecting at least one selected Kalman filter from the set of Kalman filters and at least one selected navigation solution from the set of navigation solutions, and operating the at least one selected Kalman filter and the at least one selected navigation solution to provide fine alignment convergence to a correct azimuth. The selecting is based at least in part on the generated error correction, each navigation solution includes an azimuth different from the azimuth of each other navigation solution and each navigation solution azimuth is separated by no more than two times a small angle error assumption.

20 Claims, 11 Drawing Sheets

HIGH SPEED GYROCOMPASS ALIGNMENT VIA MULTIPLE KALMAN FILTER BASED HYPOTHESIS TESTING

CROSS REFERENCE TO RELATED APPLICATIONS

This application is related to U.S. patent application Ser. No. 11/421,347, having a title of "RAPID SELF-ALIGNMENT OF A STRAPDOWN INERTIAL SYSTEM THROUGH REAL-TIME REPROCESSING" filed on the same date herewith. The Application is incorporated herein by reference.

BACKGROUND

A strapdown inertial navigation unit contains inertial sensors (gyros and accelerometers) fixed within an inertial measurement unit (IMU). Because the sensors are fixed to the IMU chassis ("strapped down"), the angular relationship of their input axes to chosen IMU axes is constant, so rotations and accelerations measured by the sensors can be used to compute equivalent rotations and accelerations along IMU axes. Typically the IMU is fixed to the body of a host vehicle to be navigated, such as an aircraft or land vehicle, but it can be a free-standing unit carried by an individual.

For the unit to navigate accurately, the IMU's initial attitude, that is the IMU's angular orientation with respect to some chosen navigation reference frame, must be determined through an alignment procedure. (By long tradition the procedure is called "alignment", even if, as in most strapdown systems, there is no actual repositioning of the unit. For such systems the "alignment" or more properly "self-alignment" procedure involves only the collection and processing of data from the inertial sensors and other data supplied by the user or obtained from other sensors.)

Specifically, the alignment procedure determines the directions of the orthogonal axes of the IMU with respect to a selected navigation reference frame. An oft-used reference frame is defined by vectors that point north, east and down at the IMU's location. The angular relationship between the IMU axes and the navigation reference frame is defined by the values of a selected set of attitude parameters. Several such sets are in common use. But whatever set is selected, the purpose of the alignment procedure is to develop numeric values for the parameters that constitute that set. For subsequent inertial navigation to be accurate, these values must be determined accurately.

When heading of the vehicle is unspecified, the alignment procedure is executed in two phases. The first phase, coarse alignment, determines heading to within, say, a few degrees, after which the second phase, fine alignment, is started. Fine alignment further refines the heading error, and also solves for various inertial sensor errors. The two phases are necessary because of the limitations of alignment algorithms that approximate the equations that govern the inertial system with linearized forms; this includes Kalman filters and most other alignment algorithms. The underlying assumption for such algorithms is that, for the ranges of the errors being estimated, the governing equations of the inertial system are well approximated by a linearization about a known approximate solution. But this assumption is not justified for an unspecified heading; the actual heading can differ as much as 180 degrees from an assumed heading, and the governing equations involve sines and cosines of heading, which are far from linear over this wide range. For such large initial errors, the ignored non-linearities in the governing equations limit the accuracy of the coarse alignment algorithm, corrupting not only the estimate of heading but also the estimates of other quantities such as inertial sensor errors. The fine alignment algorithm, on the other hand, can separate a richer selection of alignment and inertial sensor errors, and can do it more accurately, but only when all the initial errors are sufficiently small. So coarse alignment is undertaken first, to reduce the errors to sizes that fine alignment can accommodate.

Both coarse alignment and fine alignment operate on inertial data supplied at regular intervals by the inertial sensors, and on "observation data" from some external source. As defined herein, input data comprises the inertial data and the observation data. Observation data may be measurements by one or more aiding sensors such as a GPS receiver, or can be information supplied by the user, such as the fact that the vehicle is stationary. A common alignment approach is to initialize the inertial navigation system with externally-supplied or default values for the navigation variables and allow it to navigate. The resulting navigation data are used to predict the data for an external observation; then these predicted observation data are compared with the actual observation data. A Kalman filter algorithm uses the differences in the observation data and estimates of the probability distributions of navigation errors to estimate the navigation errors; the error estimates are applied as corrections to the navigation data. The process is repeated at regular intervals.

Coarse alignment begins by determining the attitude with respect to the local level plane and using the outputs of accelerometers as they sense the effect of gravity. Because gravity is so much larger than the accelerometer errors, under stationary conditions an accurate determination is made quickly, typically in a few seconds. In contrast, the determination of heading requires that the rotation of the earth be sensed by gyros. Earth rate is larger than the gyro errors, but slow enough that typically it takes on the order of a minute to determine heading to within a few degrees. Finally, fine alignment takes a few minutes more to reduce the heading error to a small fraction of a degree and to accurately estimate other system errors, such as those for inertial sensors. In total, for vehicles stationary with respect to the earth, the complete alignment procedure can take several minutes. For situations in which alignment must be preformed with aiding data of lesser accuracy (e.g., airborne Doppler radar), or while the system is experiencing vigorous dynamics (e.g., aboard ship in heavy seas), accurate alignment can take significantly longer.

Many operators of vehicles with inertial navigators want to prepare their vehicles for takeoff within a very short time. In military, medical and law enforcement applications, the time spent sitting on the runway while the inertial navigation unit completes its alignment procedure is lost time that can be critical to the safety of soldiers and/or citizens.

For short alignment times, there is a trade-off between alignment time and alignment accuracy. Within limits, a longer alignment time leads to better alignment accuracy and therefore to improved accuracy in the subsequent navigation. How this trade is resolved depends on the application and in some applications on decisions made by the user. For example, in an urgent situation, a pilot may elect to cut alignment time short, and accept the resulting degradation in navigation accuracy. Any improvement that allows the same accuracy to be achieved in less alignment time may also provide improved accuracy with the same alignment time, or may provide some combination of improved alignment time and improved accuracy.

SUMMARY

A first aspect of the present invention provides a method of aligning a gyro-compass comprising operating at least two Kalman filters in a set of Kalman filters to generate an error correction to at least a single navigation solution in a set of navigation solutions in order to provide coarse alignment azimuth convergence. The method further comprises selecting at least one selected Kalman filter from the set of Kalman filters and at least one selected navigation solution from the set of navigation solutions, and operating the at least one selected Kalman filter and the at least one selected navigation solution to provide fine alignment convergence to a correct azimuth. The selecting is based at least in part on the generated error correction. Each navigation solution includes an azimuth different from the azimuth of each other navigation solution. Additionally, each navigation solution azimuth is separated by no more than two times a small angle error assumption.

A second aspect of the present invention provides an inertial navigation unit comprising at least one sensor to provide input data and at least two Kalman filters communicatively coupled to the at least one sensor. The inertial navigation system generates at least a single navigation solution based at least in part on the input data using the at least two Kalman filters. The inertial navigation system termites the operation of one or more Kalman filter based on at least in part measurement residuals and estimated-convergent-parameter errors received from each Kalman filter. The inertial navigation system operates at least one of a selected Kalman filter and a selected navigation solution to provide fine alignment convergence to a convergent parameter.

A third aspect of the present invention provides a program product comprising program instructions, embodied on a storage medium, that are operable to cause a programmable processor to operate least two Kalman filters in a set of Kalman filters in order to generate an error correction to at least single navigation solution in a set of navigation solutions to provide azimuth convergence. The program instructions are also operable to select at least one selected Kalman filter from the set of Kalman filters and at least one selected navigation solution from the set of navigation solutions and operate the at least one selected Kalman filter and the at least one selected navigation solution to provide azimuth convergence to the required accuracy level wherein a completion time for a gyrocompass alignment to the required accuracy level is reduced. The selecting is based on at least in part the generated error correction.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1A:
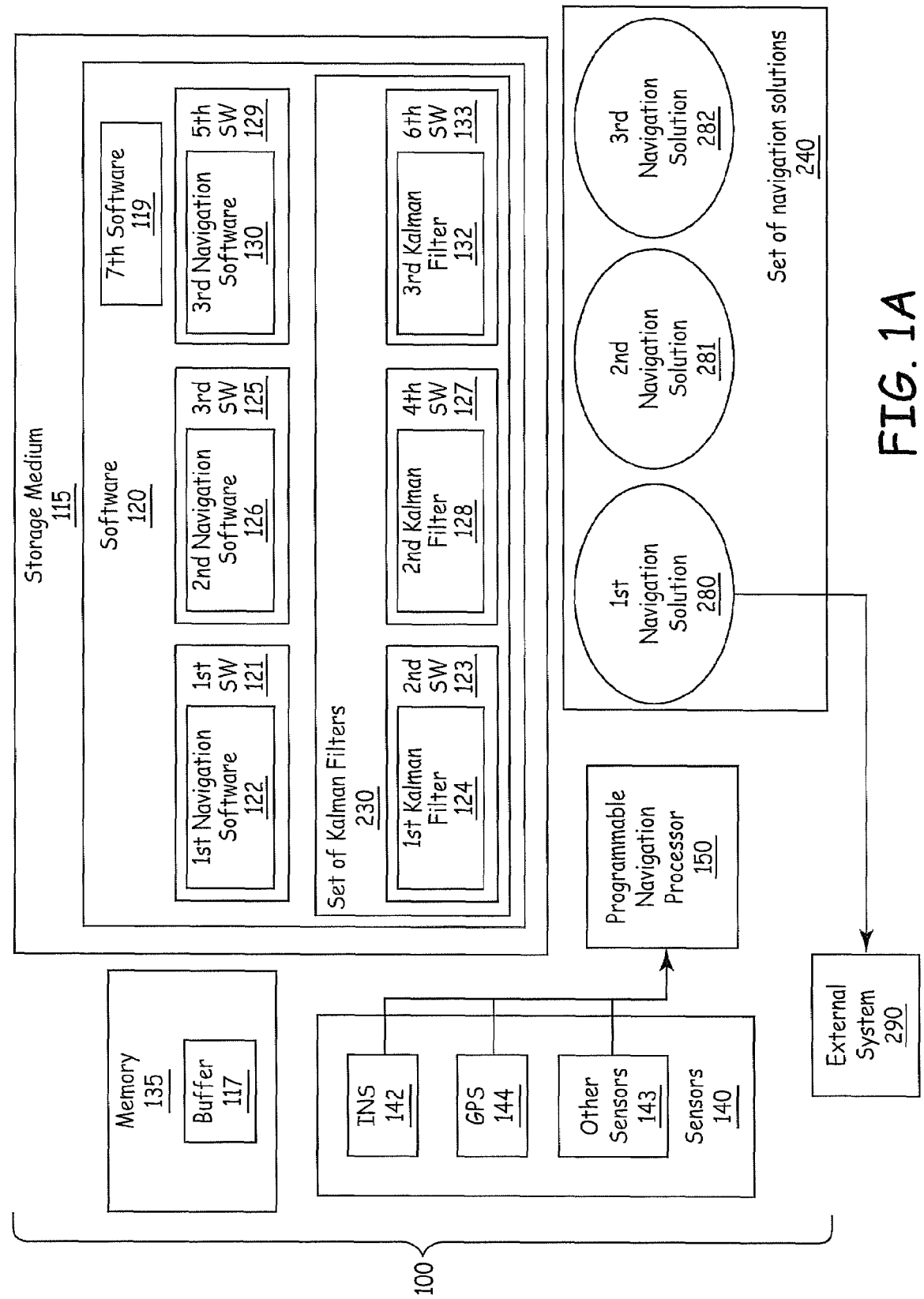
FIG. 1A is a block diagram of an embodiment of an inertial navigation unit.

This disclosure presents a method for initial self-alignment of a strapdown inertial system that reduces the time required to achieve a given level of accuracy. The self alignment process advances sequentially from a leveling phase, a coarse alignment phase, and a fine alignment phase. Through the use of multiple Kalman filters and, in one configuration, multiple navigation solutions, the normal time spent in coarse azimuth alignment is avoided. In addition, this method eliminates errors and non-linearities associated with applying large azimuth error assumptions through a linear Kalman filter.

This method makes use of multiple Kalman filters with initial error assumptions that overlap the true azimuth error. One of the at least two Kalman filters and the navigation solution associated with that Kalman filter makes a valid small angle error approximation, allowing for a valid linear error assumption for that Kalman filter. Self-alignment of the strapdown INS becomes a combination of a hypothesis testing problem and a linear Kalman filter based alignment problem.

A first implementation of an inertial navigation system includes set of navigation solutions and Kalman filters that have the following features: each navigation solution has a unique Kalman filter assigned to it; each navigation solution is initialized with a different azimuth assumption; the separation in azimuth assumption between the navigation solutions is small enough so that each Kalman filter can make a small angle error assumption so that the sine of the azimuth angle error can be assumed to be the azimuth angle error within a small error; each Kalman filter can make the same azimuth error assumption but is not required to; the magnitude of the initial azimuth error uncertainty for each Kalman filter is controlled by the azimuth error separation of the navigation solutions; selection software determines which navigation solution is most accurate; the selection of which solution is correct is based on the size of the azimuth correction from each Kalman filter (smaller is better) and the size of the measurement residuals (again, smaller is better); the selected solution (navigation solution and Kalman filter) can be one Kalman filter and associated navigation solution; and selected solution (navigation solution and Kalman filter) can be a linear combination of two or more Kalman filters and the associated navigation solutions.

A second implementation of an inertial navigation system in accordance with the present invention includes a single navigation solution and a set of Kalman filters that have the following features: each Kalman filter is initialized with a different azimuth error assumption; the separation in the azimuth error assumptions of the Kalman filters is small enough that each Kalman filter can make a small angle error assumption; the magnitude of the initial azimuth error assumption is controlled by the magnitude of separation in the initial azimuth error; selection software determines which Kalman filter solution is most accurate; the selection of the correct solution is based on the size of the azimuth correction from each Kalnan filter (smaller is better) and the size of the measurement residuals (again, smaller is better); the final navigation solution can be formed from an individual Kalman filter; and the final navigation solution can also be formed from a linear combination of the Kalman filter solutions.

A third implementation of an inertial navigation system in accordance with the present invention includes a combination of the first implementation and the second implementation described above. In this case, each navigation solution in the first method has more than one Kalman filter assigned to it. The small angle error assumption is required and the final solution can be formed either from one selected Kalman filter and associated navigation solution or from a linear combination thereof.

FIG. 1A is a block diagram of an embodiment of an inertial navigation unit 100. The inertial navigation unit 100 is implemented as a navigation system mounted to a vehicle, such as an air-based vehicle, a land-based vehicle or a water-based vehicle. The inertial navigation unit 100 comprises one or more sensors 140, one or more programmable navigation processors 150, a buffer 117 located in memory 135, and software 120 stored or otherwise embodied in or on a storage medium 115.

The sensors 140 include one or more inertial sensors (INS) 142, also referred to here as "inertial measurement units (IMU) 142," one or more global positioning system (GPS) receivers 144, and, in the embodiment shown in FIG. 1A, one or more other sensors 143. In one implementation of this embodiment, the inertial sensors 142 comprise a gyrocompass. In another implementation of this embodiment, the inertial sensors 142 comprise part of a gyrocompass. The terms "inertial sensors" and "gyrocompass" are used interchangeably throughout this document.

The one or more sensors 140 are communicatively coupled to the programmable navigation processor 150. The programmable navigation processor 150 receives sensor data from the sensors 140 and corrective feedback from the software 120. The one or more sensors 140 output data (for example, in analog or digital form) that is indicative of one or more physical attributes associated with the inertial navigation unit 100. This data is also referred to here as "input data." In one implementation of this embodiment, the sensors 140 execute software to generate the input data that is input to programmable navigation processor 150.

The software 120 comprises appropriate program instructions that, when executed by the programmable navigation processor 150, cause the programmable navigation processor 150 to perform the processing described here as being carried out by the software 120. Such program instructions are stored on or otherwise embodied on or in one or more items of storage media 115 (only one of which is shown in FIG. 1).

The most algorithmically simple implementation of this self-alignment method involves using multiple navigation solutions, each with a different initial azimuth. The goal of this implementation is to have the actual azimuth error meet a small angle error assumption, where the sine of the error is equivalent to the actual error. For purposes of azimuth alignment, anything less than five degrees of azimuth error achieves a small angle approximation.

The following software description of the self-alignment method describes the process for three navigation solutions and three Kalman filters. The actual process requires at least thirty-six (36) navigation solutions in order to satisfy the small angle error assumption but the discussion is limited to three navigation solutions for simplicity of the discussion and clarity of the figures. The description is generic enough that it can be expanded to encompass additional navigation solutions and Kalman filters.

The software 120 comprises first software ($1^{st}$ SW) 121, second software ($2^{nd}$ SW) 123, third software ($3^{rd}$ SW) 125, fourth software ($4^{th}$ SW) 127, fifth software ($5^{th}$ SW) 129, sixth software ($6^{th}$ SW) 133, and seventh software ($7^{th}$ SW) 119 which are executed by the programmable navigation processor 150. The first software 121 comprises first navigation software (SW) 122 that executes at a tasking rate fast enough to support integration of the inertial sensor data (typically 50 Hz to 600 Hz). The second software 125 comprises a first Kalman filter 124. The third software 125 comprises second navigation software (SW) 126 that executes at the tasking rate fast enough to support integration of the inertial sensor data. The fourth software 127 comprises a second Kalman filter 128. The fifth software 129 comprises third navigation software (SW) 130 that executes at the tasking rate fast enough to support integration of the inertial sensor data. The sixth software 133 comprises a third Kalman filter 132. The seventh software 119 comprises software to analyze corrective feedback generated by the first Kalman filter 124, second Kalman filter 128, third Kalman filter 132, and so on. The seventh software 119 also comprises software to select a selected Kalman filter based at least in part on the corrective feedback.

The first Kalman filter 124, second Kalman filter 128, and third Kalman filter 132 form a set of Kalman filters represented generally by the numeral 230. In one implementation of this embodiment, the set of Kalman filter 230 includes thirty-six (36) or more Kalman filters, since thirty-six (36) Kalman filters provide the desired performance. Some performance improvement can be achieved with more filters.

The first navigation solution 280, the second navigation solution 281 and the third navigation solution 282 form a set of navigation solutions 240. In one implementation of this embodiment, one navigation solution is required for each Kalman filter. In another implementation of this embodiment, one navigation solution is required for the set of Kalman filters 230.

The first navigation software 122 initializes the first navigation solution with a first initial azimuth estimate, also referred to here as a first initial azimuth or first azimuth. The second navigation software 126 initializes the second navigation solution with a second initial azimuth estimate, also referred to here as a second initial azimuth or second azimuth. The third navigation software 130 initializes the third navigation solution with a third initial azimuth estimate, also referred to here as a third initial azimuth or third azimuth. The navigation solutions are organized so that 360 degrees of possible azimuth error are initialized.

Figure 1B:
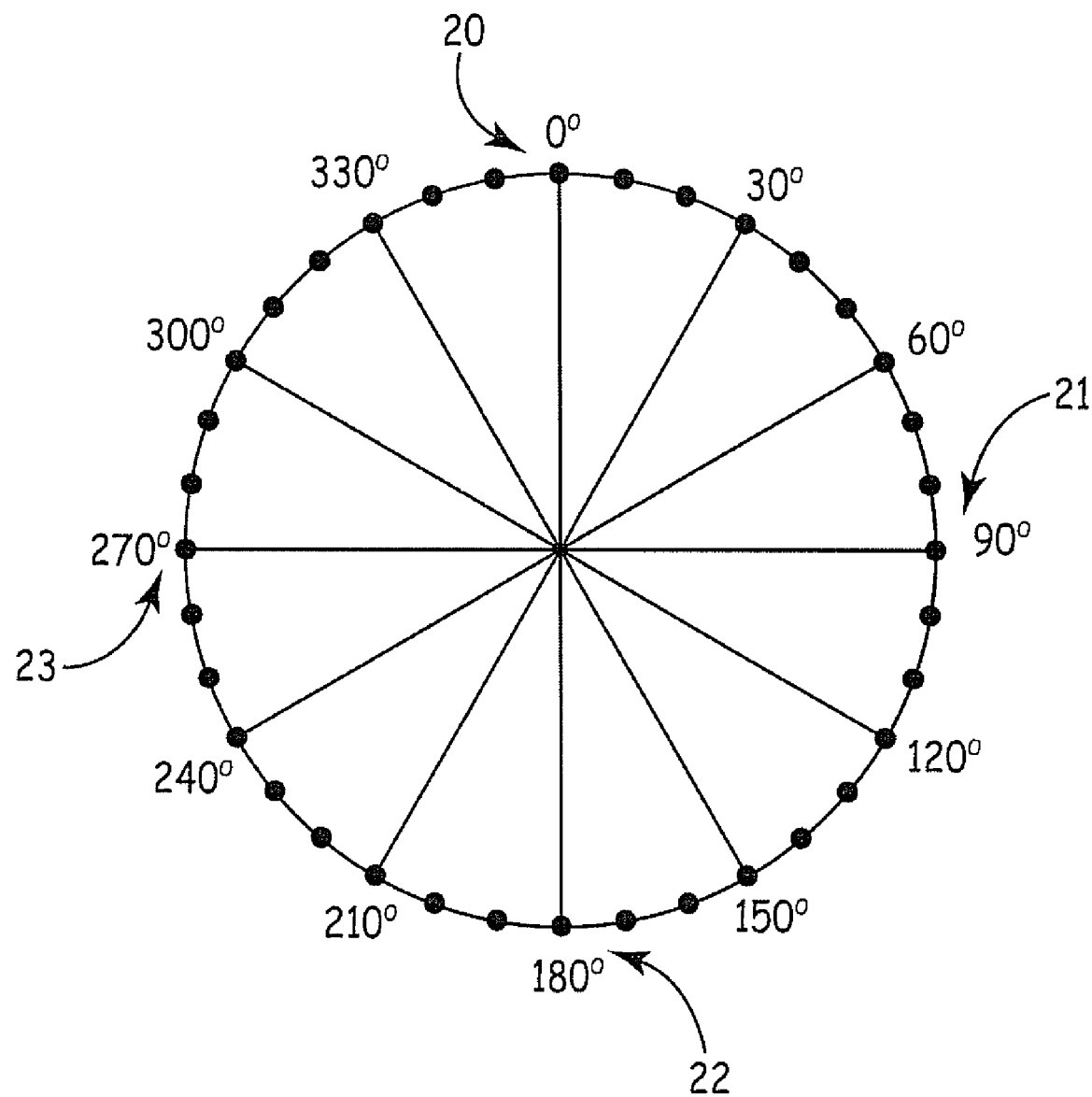
FIG. 1B shows an exemplary angular relationship for initial azimuths of thirty-six navigation solutions in the set of navigation solution.

If a small angle error assumption of five degree is implemented, then thirty-six (36) navigation solutions and Kalman filters are required. In this case, each navigation solution has an initial azimuth that is separated by ten degrees from the other initial azimuths of the other navigation solutions internal the set of navigation solutions 240. FIG. 1B shows an exemplary angular relationship for initial azimuths of thirty-six navigation solutions in the set of navigation solution 240.

As shown in FIG. 1B, the first navigation solution has a 0° initial azimuth estimate generally indicated as dot 20, the 10$^{th}$ navigation solution has a 90° initial azimuth estimate generally indicated as dot 21, the 19$^{th}$ navigation solution has a 180° initial azimuth estimate generally indicated as dot 22 and the 28$^{th}$ navigation solution has a 270° initial azimuth estimate generally indicated as dot 23. In this manner, the set of azimuths in the set of navigation solutions equidistantly spans 360°. If a three degree separation is used, then 60 navigation solutions and Kalman filters are required apart to equidistantly span the 360°. Other separations are possible of less than ten degrees are possible.

The first navigation software 122 generates a first navigation solution 280 (for example, a position, velocity, and attitude estimate formatted in a quaternion) based at least in part on the input data. The first navigation software 122 also implements a feedback control used to correct the navigation solution 280 with at least inputs from the first Kalman filter 124. Once every Kalman filter cycle, the first Kalman filter 124 generates an error estimate for navigation solution 280 based at least in part on the input data. The first Kalman filter 124 cycles at the Kalman filter tasking rate. Typical Kalman filter tasking rates range from once every half second to once every twentieth of a second.

After a start of an alignment process for the inertial navigation unit 100, the first navigation software 122 executing on the programmable navigation processor 150 writes the error-correction data generated by the first Kalman filter 124 into the buffer 117. The error-correction data generated by the first Kalman filter 124 is also referred to here as "first-error-correction data." The seventh software 119 executing on the programmable navigation processor 150 reads the first-error-correction data from the buffer 117 during a coarse alignment phase of a gyrocompass alignment. The first-error-correction data supports the process described below with reference to method 300 of FIG. 3. The buffer 117 comprises any suitable form of volatile memory and/or non-volatile memory.

In the implementation of this embodiment shown in FIG. 1A, the first navigation software 122 also sends the first navigation solution 280 to an external system 290.

The second navigation software 126 generates a navigation solution 280 based at least in part on the input data. The second navigation software 126 also implements a feedback control used to correct the second navigation solution 281 with at least inputs from the second Kalman filter 128. Once every Kalman filter cycle, the second Kalman filter 128 generates an error estimate for the second navigation solution 281 based at least in part on the input data. The second Kalman filter 128 cycles at the Kalman filter tasking rate.

After a start of an alignment process for the inertial navigation unit 100, second navigation software 126 executing on the programmable navigation processor 150 writes the error-correction data generated by the second Kalman filter 128 into the buffer 117. The error-correction data generated by the second Kalman filter 128 is also referred to here as "second-error-correction data." The software 119 executing on programmable navigation processor 150 reads the second-error-correction data from the buffer 117 and compares the second-error-correction data with the first-error-correction data during a coarse alignment phase of a gyrocompass alignment. The second-error-correction data supports the process described below with reference to method 300 of FIG. 3. In one implementation of this embodiment, the second navigation software 126 also sends the second navigation solution 281 to an external system 290.

The third navigation software 130 generates a third navigation solution 282 based at least in part on the input data. The third navigation software 130 also implements a feedback control used to correct the third navigation solution 282 with at least inputs from the third Kalman filter 132. Once every Kalman filter cycle, the third Kalman filter 132 generates an error estimate for the third navigation solution 282 based at least in part on the input data. The third Kalman filter 132 cycles at the at the Kalman filter tasking rate.

After a start of an alignment process for the inertial navigation unit 100, third navigation software 130 executing on the programmable navigation processor 150 writes the error-correction data generated by the third Kalman filter 132 into the buffer 117. The error-correction data generated by the third Kalman filter 132 is also referred to here as "third-error-correction data." The seventh software 119 executing on programmable navigation processor 150 reads the third-error-correction data from the buffer 117 and compares the third-error-correction data with the first-error-correction data and the second-error-correction data during a coarse alignment phase of a gyrocompass alignment. The third-error-correction data supports the process described below with reference to method 300 of FIG. 3. In one implementation of this embodiment, the third navigation software 130 also sends the third navigation solution 282 to an external system 290. The additional Kalman filters and navigation solutions and software in the inertial navigation unit 100 operate in like manner.

The seventh software 119, when executed, determines which of the first-error-correction data, the second-error-correction data, third-error-correction data up to the final-error-correction data (e.g., thirty-sixth-error-correction data) is smaller and selects at least one Kalman filter and/or at least one navigation solution based on the determinations. In one implementation of this embodiment, the seventh software 119 determines which of the first-error-correction data, the second-error-correction data, third-error-correction data up to the final-error-correction data (e.g., thirty-sixth-error-correction data) is the smallest. In this case, the error-correction data consists of corrections to the initial azimuth estimate and measurement residual data. The selected navigation solution and Kalman filter is the filter with the smallest combination of these two parameters.

Figure 2A:
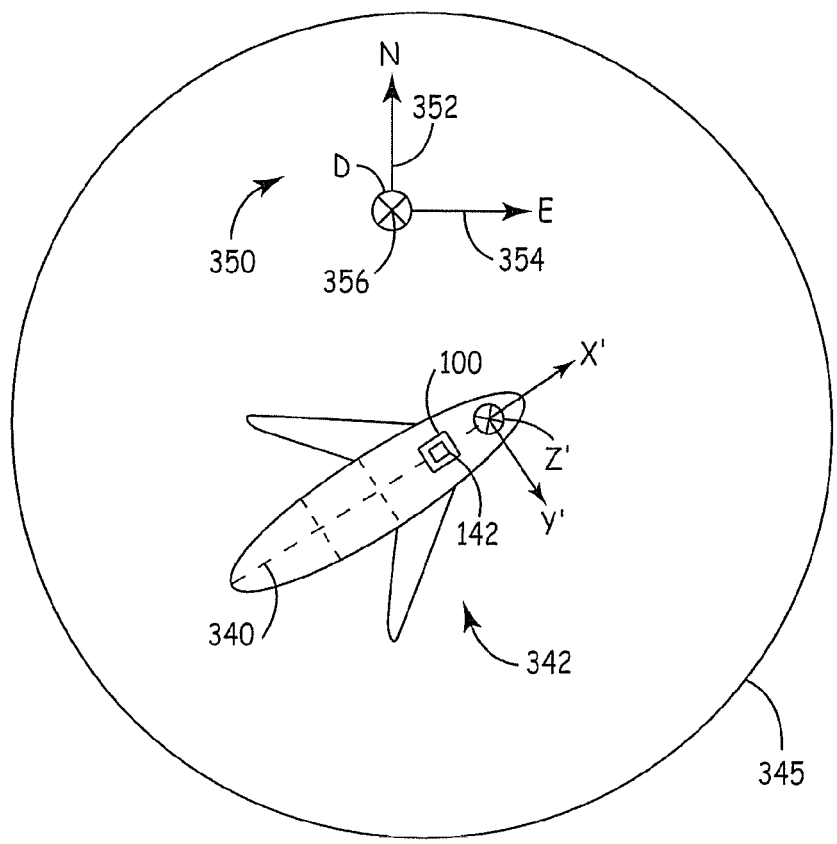
FIG. 2A is a diagram illustrating an inertial navigation unit on a vehicle with respect to a reference frame.

FIG. 2A is a diagram illustrating an exemplary strapdown inertial navigation unit 100 (FIG. 1A) installed in a fixed orientation within a host vehicle 340. Within the inertial navigation unit 100 (FIG. 1A) is an inertial measuring unit (IMU) 142 containing inertial sensors which measure components of angular rate and sensed acceleration. The measured angular rates and accelerations are used to compute the equivalent angular rates and sensed accelerations along a set of orthogonal IMU axes X', Y', Z' that constitute the IMU reference frame. (For clarity FIG. 2A does not distinguish between the reference frames for the inertial navigation unit 100, the IMU 142, and the host vehicle 340, but in practice the three can differ; when this is the case the invention disclosed herein still applies.) For accurate inertial navigation after departure, the attitude (angular orientation) of the IMU axes X', Y', Z' with respect to some selected navigation reference frame represented generally by the numeral 350 must be determined accurately beforehand by a procedure called "initial alignment." In FIG. 2A the exemplary navigation reference frame 350 is comprised of the orthogonal axes N 352, E 354, and D 356 which point respectively north, east and down at the location of the inertial navigation unit 100. Since the navigation reference frame axes N 352 and E 354 are orthogonal to axis D 356, which points down, axes N 352 and E 354 are necessarily level. Therefore, the reference frame comprising axes N 352 and E 354 is often called a local-level frame.

As used here the term "alignment" does not imply repositioning of any kind, neither translation nor angular re-orientation. Instead, it is a procedure in which inertial sensor data and external aiding data are processed to determine the values of certain attitude parameters that define the attitude of the IMU 142 with respect to the navigation reference frame 350. For example, one can imagine a hypothetical IMU initially oriented with its orthogonal axes X, Y, Z parallel to the north, east, down directions respectively, and then rotated about its Z, Y and X axes (sequentially, and in that order) through heading, pitch and roll angles respectively, to arrive at the real IMU's attitude. Then heading, pitch and roll are the attitude parameters, and their numeric values define the attitude of the real IMU. Note that the real IMU has not necessarily experienced these particular rotations; their rotation angles are just a way of describing its present attitude.

Attitude Heading and Reference Systems (AHRS) are instruments that typically do not navigate, but do use gyros and in some cases accelerometers to determine aircraft heading, pitch and roll. Also, some instruments use one or more gyros to sense earth rate for "north-finding" and their operation is sometimes referred to as "gyrocompassing". As used herein, the term "alignment" includes the concept of "gyrocompassing" and is meant to include the procedures and operation of all such instruments, and the invention herein disclosed is intended for use in all such instruments.

Figure 2B:
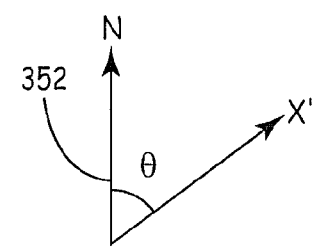
FIG. 2B is a diagram illustrating the azimuth of the vehicle shown in FIG. 2A.

In FIG. 2A, the most obvious aspect of the IMU 142 and the IMU attitude (and therefore of the aircraft attitude) is the heading; FIG. 2B shows heading angle θ to be about 50 degrees. Not visible in FIG. 2A, but still important, is the fact that IMU axes X' and Y' may not be locally level. It takes three variables to completely describe the attitude; in this case heading, pitch and roll.

Heading, pitch and roll is a set of attitude parameters popular with pilots, but this set has defects which can be troublesome for the computations carried out in inertial navigators, so most systems employ an alternative way of representing attitude such as an attitude quaternion or an attitude direction cosine matrix, both of which represent the rotation of the three-axis IMU frame with respect to a three-axis local-level navigation frame. However the invention disclosed herein applies for any set selected.

The sensors 140 shown in FIG. 1A generate information (for example, in the form of one or more analog signals or one or more digital data streams) that are the consequence of one or more kinematic attributes (location, velocity, angular orientation) of the inertial navigation unit 100 (for example, information indicative of a position and/or movement of the inertial navigation unit 100). The inertial sensors 142 provide real-time inertial data (also referred to as inertial data) to programmable navigation processor 150, in the form of sensed accelerations and angular rates, or their integrals velocity changes and rotation angles. When present, GPS receivers 144 and other sensors 143 provide "observation data" that include information indicative of the navigation unit's location, velocity or attitude to the programmable navigation processor 150. The inertial data and the observation data comprise the input data. Signals or data are communicated from or between the sensors 140 and the programmable navigation processor 150 via connections such as a data bus, a fiber optic bus, or an RS422, 1553, or an Aeronautical Radio Incorporated (ARINC) 429 connection. Other connections are possible.

In an exemplary implementation of one embodiment, the inertial sensors 142 are three gyroscopes ("gyros") and three accelerometers. Each gyro is an inertial sensor 142 that senses angular rate (or its integral, angular change) about the gyroscope's input axis. Each accelerometer is an inertial sensor 142 that senses the component of linear acceleration (or its integral, a change in linear velocity) along the accelerometer's input axis. In this exemplary implementation, the three gyros are oriented with their input axes along three mutually orthogonal axes (in this case, the X', Y', Z' axes of FIG. 2A) and the three accelerometers are oriented with their input axes along the same IMU axes X', Y', Z'.

The outputs of the gyros and accelerometers are processed by programmable navigation processor 150 at a sufficiently high rate that the angular and velocity changes between successive executions are small. The angular changes are used to update the attitude parameters (the elements of a direction cosine matrix or of a quaternion), and the attitude parameters are used to transform the velocity changes sensed along IMU axes X', Y', Z' into equivalent velocity changes along navigation reference frame axes N 352, E 354 and D 356. These are used to update the reference-frame velocities, which are then integrated to compute location changes. These are used to update the location of inertial navigation unit 100, and since inertial navigation unit 100 is fixed to the host vehicle 340, the location of the host vehicle 340 is also updated.

In this exemplary implementation of this embodiment, the gyros and accelerometers are single-degree-of-freedom devices; each makes its measurements with respect to a single input axis. In other implementations of such an embodiment, the gyros and/or accelerometers are multiple-degree-of-freedom devices that make measurements with respect to more than one input axis.

In one implementation of this embodiment, the gyros are ring laser gyros and the accelerometers are pulse-rebalance accelerometers. In other implementations of such an embodiment, the gyros may be of different types such as mechanical rate gyros, fiber-optic gyros, vibrating reed gyros, or other types, and the accelerometers may be of different types such as vibrating beam, vibrating reed, or other types.

In another implementation of this embodiment, the attitude parameters are the elements of a quaternion that represent the attitude of the IMU axes X', Y', Z' with respect to the navigation reference frame 350. A quaternion represents the attitude of one three-dimensional reference frame with respect to another, in the form of four attitude parameters that are functions of the direction of the single axis about which one frame could be rotated to coincide with the other, and the associated rotation angle. In another implementation of this embodiment, the attitude parameters are the elements of a direction cosine matrix that represents the attitude of the IMU axes X', Y', Z' with respect to the navigation reference frame 350. A direction cosine matrix is a 3×3 array of numbers that represents the attitude of one three-dimensional reference frame with respect to another, and facilitates the conversion of vector components with respect to one frame into the equivalent components with respect to the other frame.

In one implementation of this embodiment, one or more of the sensors 140 includes a processor (not shown) which executes software (not shown) to pre-process and/or prefilter (as it is known in the art) the raw sensor data to convert it to a form suitable for input to programmable navigation processor 150. In another implementation of this embodiment, input preprocessor and/or measurement prefilter functions are implemented as a part of the real-time navigation software 120 executed by the programmable navigation processor 150.

As shown in FIG. 1A, an external system 290 is communicatively coupled to the programmable navigation processor 150 through a user interface (not shown). Signals or data are communicated between the external system 290 and the programmable navigation processor 150 over the user interface via connections such as an RS422, 1553 or other electrical data bus, an Aeronautical Radio Incorporated (ARINC) data bus, a fiber optic data bus or a radio link. Other connections are possible. The external system 290 may be a host vehicle computer, or a keyboard, mode switch or similar device on a user console or on a hand-held device. Data supplied from the external system 290 and used for inertial navigation system alignment or used to control inertial navigation system alignment constitute "input data." In some implementations, a user may input mode commands that cause the programmable navigation processor 150 to use stored default values as aiding data. Such data also constitute "input data" as used herein.

The software code 120 comprises appropriate program instructions that, when executed by the programmable navigation processor 150, cause the programmable navigation processor 150 to perform the processing described here as being carried out by the software 120. Such program instructions are stored on or otherwise embodied on one or more items of memory 135, only one of which is shown in FIG. 1A. As used here, the memory 135 is a storage medium. In one implementation of this embodiment, the memory 135 is integral to an extended storage medium.

Figure 3:
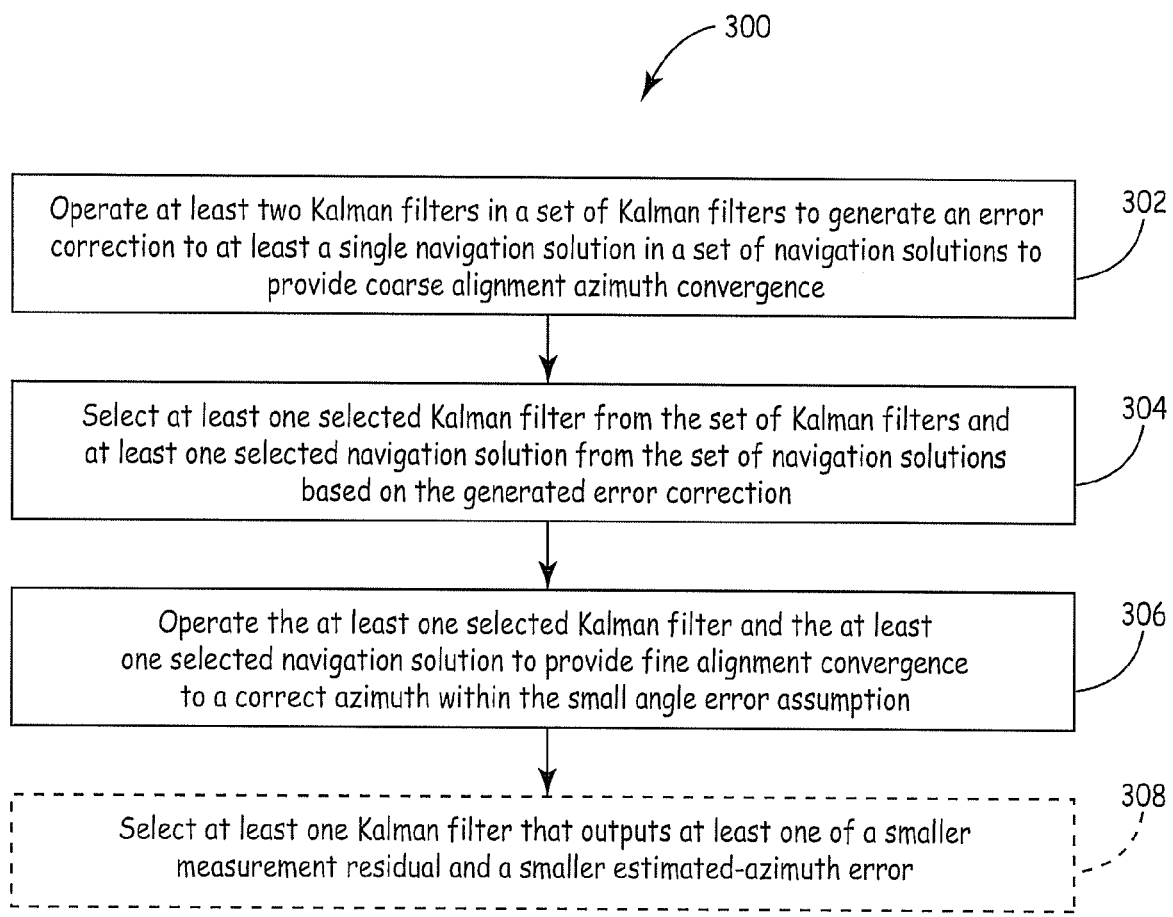
FIG. 3 is a flow diagram of one embodiment of a method of aligning a gyrocompass in an inertial navigation unit.
Figure 4:
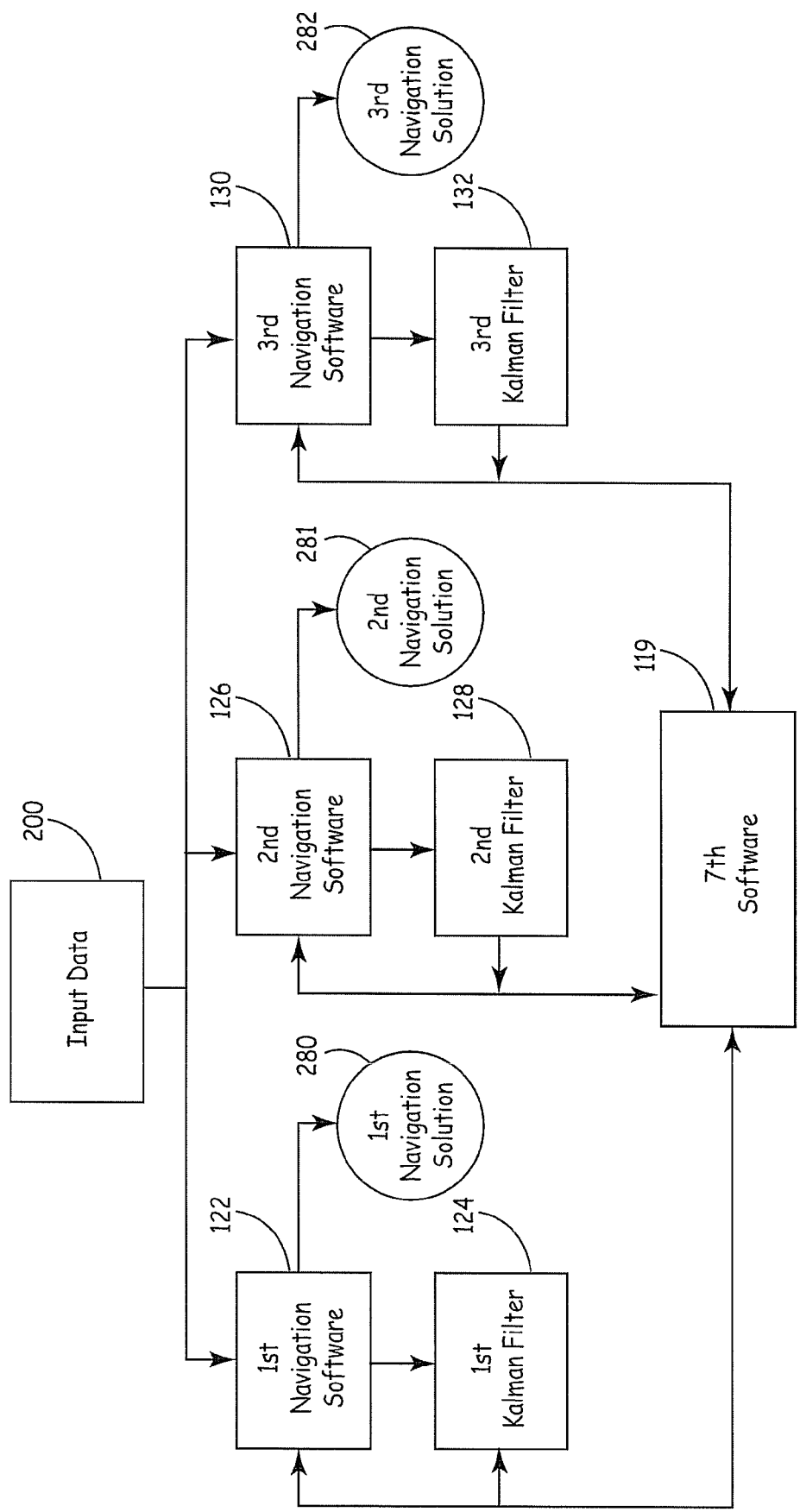
FIG. 4 is a logic diagram of one embodiment of a coarse alignment phase of a gyrocompass alignment.
Figure 5:
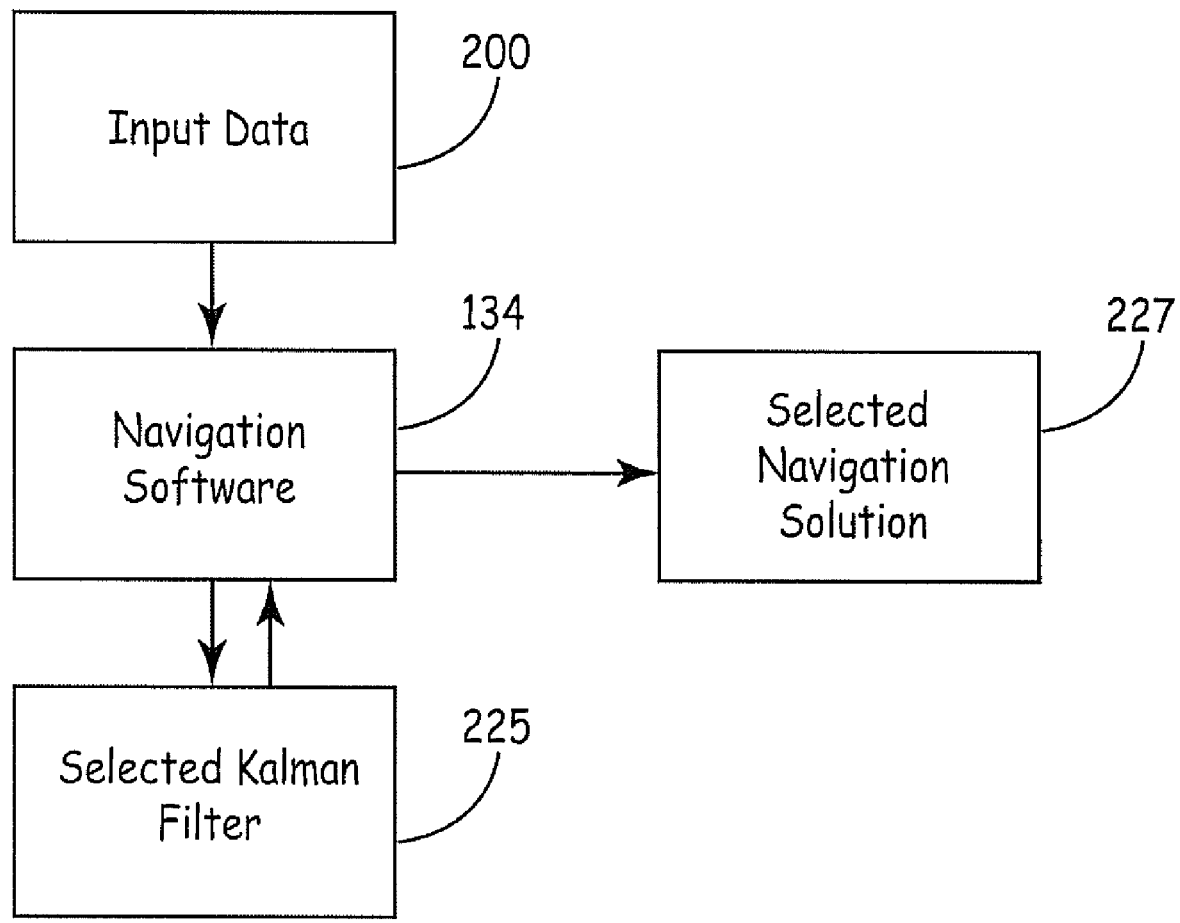
FIG. 5 is a logic diagram of one embodiment of a portion of the fine alignment phase of a gyrocompass alignment.

FIG. 3 is a flow diagram of one embodiment of a method 300 of aligning a gyrocompass in an inertial navigation unit 100. The particular embodiment of method 300 shown in FIG. 3 is described here as being implemented using the inertial navigation unit 100 described above with reference to FIG. 1A. The processing of method 300 is described with reference to the logic diagrams of FIGS. 4-5. The logic diagram of FIG. 4 illustrates the operation of the processing associated with block 302 for a coarse alignment of a gyrocompass in which the set of Kalman filters 230 (FIG. 1A) and the set of navigation solutions 240 (FIG. 1A) are implemented. The logic diagram of FIG. 5 illustrates the operation of the processing associated with block 306 for a fine alignment of the gyrocompass.

At block 302, the programmable navigation processor 100 operates at least two Kalman filters in a set of Kalman filters to generate an error correction to at least a single navigation solution in a set of navigation solutions in order to provide coarse alignment azimuth convergence. As shown in FIG. 4, the programmable navigation processor 150 executes at least one of the first navigation software 122, the second navigation software 126 and the third navigation software 130 to operate at least one of a respective first Kalman filter 124, second Kalman filter 128, and third Kalman filter 132 in the set of Kalman filters 230. In this manner, the programmable navigation processor 150 generates an error correction to at least a single navigation solution, such as first navigation solution 280, the second navigation solution 281 and/or the third navigation solution 282 in the set of navigation solutions 240 to provide coarse alignment convergence to a convergent parameter.

For an implementation of an embodiment in which there is a single navigation solution and a plurality of Kalman filters being executed by the programmable navigation processor 100, each Kalman filter in the set of Kalman filters is initialized to a different initial azimuth error assumption. In one implementation of this embodiment, the initial azimuth error assumption for each Kalman filter in the set of Kalman filters is separated by no more than two times the small angle error assumption. In another implementation of this embodiment, the initial azimuth error assumptions for the Kalman filters in the set of Kalman filters are uniformly distributed within 360°. In yet another implementation of this embodiment, the initial azimuth error assumptions for the Kalman filters in the set of Kalman filters are initialized for less than about one half of the angle separating the Kalman filters.

For an implementation of an embodiment in which there are multiple navigation solutions and associated Kalman filters being executed by the programmable navigation processor 100, each Kalman filter in the set of Kalman filters is initialized in the same manner. In this case, each navigation solution 280, 281, and 282 includes azimuth initialization that is different from the azimuth initialization of each other navigation solution 280, 281, and 282. Thus, the azimuth initialization of navigation solution 281 differs from the azimuth initialization of the second navigation solution 281 and the third navigation solution 282.

In this implementation, the azimuth error initializations for the plurality of navigation solutions are uniformly distributed within 360° as shown in FIG. 1B. For example, the azimuth error initialization for first navigation solution 280 is 0°, the azimuth error initialization for second navigation solution 281 is 10° and the azimuth error initialization for third navigation solution 282 is 20°. If each azimuth error initialization in the navigation solutions is separated by at least 10° degrees from each other navigation solution, then thirty-six (36) Kalman filters are required. In another exemplary case, the azimuth error initializations in sixty (60) navigation solutions are separated by at least 6° from each other navigation solution and sixty (60) Kalman filters are associated with each of the sixty (60) navigation solutions. Other azimuth error initializations are possible. In one implementation of this embodiment, a small angle assumption on the order of 10° or less is used to minimize the time to complete the gyroscopic alignment.

FIG. 4 is a logic diagram of one embodiment of a coarse alignment phase of a gyrocompass alignment in which the at least two Kalman filters comprises at least thirty-six Kalman filters, represented generally as $1^{st}$, $2^{nd}$ and $3^{rd}$ Kalman filters, and in which the at least one navigation solution comprises at least thirty-six associated navigation solutions. In this exemplary implementation, the number of Kalman filter equals the number of navigation solutions, and each Kalman filter is assigned an associated navigation solution. The selected Kalman filter and the selected navigation solution provide azimuth convergence to the required accuracy level so that a completion time for a gyrocompass alignment to the required accuracy level is reduced.

As shown by the logic diagram in FIG. 4, the first navigation software 122 executing on the programmable navigation processor 150 operates the first Kalman filter 124 to generate an error correction for the first navigation solution 280. As is also shown by the logic diagram in FIG. 4, the second navigation software 126 executing on the programmable navigation processor 150 operates the second Kalman filter 128 to generate an error correction for the second navigation solution 281. As is also shown by the logic diagram in FIG. 4, the third navigation software 130 executing on the programmable navigation processor 150 operates the third Kalman filter 132 to generate an error correction for the third navigation solution 282. The programmable navigation processor 150 executes the software 120 in order to provide the coarse alignment to convergence to a convergent parameter. This same process is executed similarly for all associated Kalman filter/navigation solution combinations in the inertial navigation unit 100. In one implementation of this embodiment, the convergent parameter is an azimuth parameter and the estimated-convergent-parameter error is an estimated-azimuth error.

At block 304 (shown in FIG. 3), the programmable navigation processor 150 executes seventh software 119 to select at least one selected Kalman filter from the set of Kalman filters 230 and at least one selected navigation solution from the set of navigation solutions 240. During coarse alignment, the seventh software 119 determines which error corrections from the set of Kalman filters 230 are smaller or smallest. The seventh software 119 then selects one or more Kalman filters from the set of Kalman filters 230 that generated the smaller or smallest error corrections. The seventh software 119 then selects one or more associated navigation solutions from the set of navigation solutions 240 that generated the smaller or smallest error corrections. Thus, the selecting is based on the generated error correction to at least a single navigation solution, such as first navigation solution 280, the second navigation solution 281 and/or the third navigation solution 282.

In one implementation of this embodiment, the generated error correction is within a pre-selected range of error corrections. If more than one Kalman filter generates a correction error to a respective navigation solution that is within the pre-selected range of error corrections, then more than one Kalman filter is selected. In this case, the pre-selected range of error corrections is stored in the memory 135.

FIG. 5 is a logic diagram of one embodiment of a portion of the fine alignment phase of a gyrocompass alignment described with reference to block 306. At block 306, the navigation software executing on the programmable navigation processor 150 operates the at least one selected Kalman filter 225 and the at least one selected navigation solution 227 to provide fine alignment convergence to the correct azimuth within the small angle error assumption. As is shown in FIG. 5, the input data 200 received at the navigation software 134. The navigation software 134 executing on the programmable navigation processor 150 operates the selected Kalman filter 225 to generate an error correction for the selected navigation solution 227. The selected Kalman filter 225 generated an error correction within a pre-selected range of error corrections during the coarse alignment, so the fine alignment phase is reached before it would have been reached with a single Kalman filter operating in the inertial navigation unit 100.

In one implementation of this embodiment, the error correction comprises a measurement residual and an estimated azimuth error. In that case, block 308 is optionally implemented. At block 308, the programmable navigation processor 150 executing selection software, such as seventh software 119, selects the at least one Kalman filter that outputs at least one of a smaller measurement residual and a smaller estimated-azimuth error.

In the implementation of this embodiment of method 300 as described above with reference to FIGS. 3, 4 and 5, the at least two Kalman filters comprise at least thirty-six Kalman filters and the at least one navigation solution comprises at least thirty-six navigation solutions. In this case, the number of Kalman filter equals the number of navigation solutions, the Kalman filters are all initialized in the same manner, and each navigation solution includes an initial azimuth different from the initial azimuth of each of the other navigation solutions. The selected Kalman filter and the selected navigation solution provide azimuth convergence to the required accuracy level so that the completion time for a gyrocompass alignment to the required accuracy level is reduced.

In another implementation of this embodiment of method 300, each Kalman filter includes an azimuth error assumption different from the azimuth error assumption of each of the other Kalman filters.

In yet another implementation of method 300, the at least two Kalman filters comprises at least thirty-six Kalman filters and the at least one navigation solution comprises one navigation solution. In this case, the one navigation solution is the selected navigation solution and each Kalman filter includes an azimuth error assumption different from the azimuth error assumption of each of the other Kalman filters. The selected Kalman filter and the selected navigation solution provide azimuth convergence to the required accuracy level so that the time to complete a gyrocompass alignment to the required accuracy level is reduced.

Figure 6:
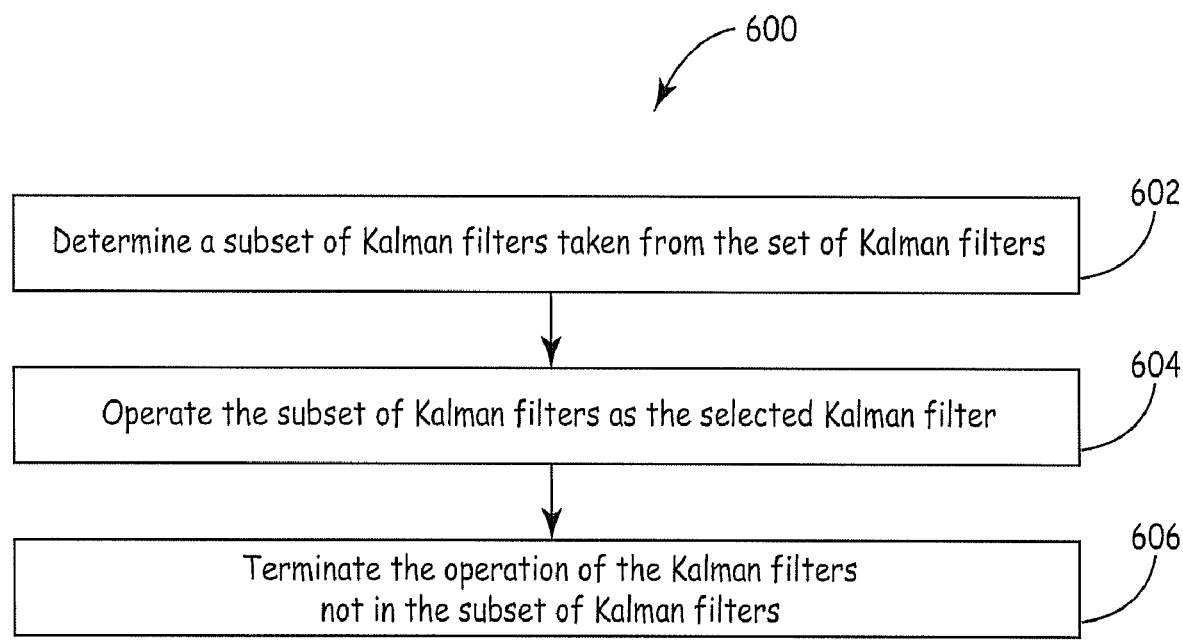
FIG. 6 is a flow diagram of one embodiment of a method of aligning a gyrocompass in an inertial navigation unit.
Figure 7:
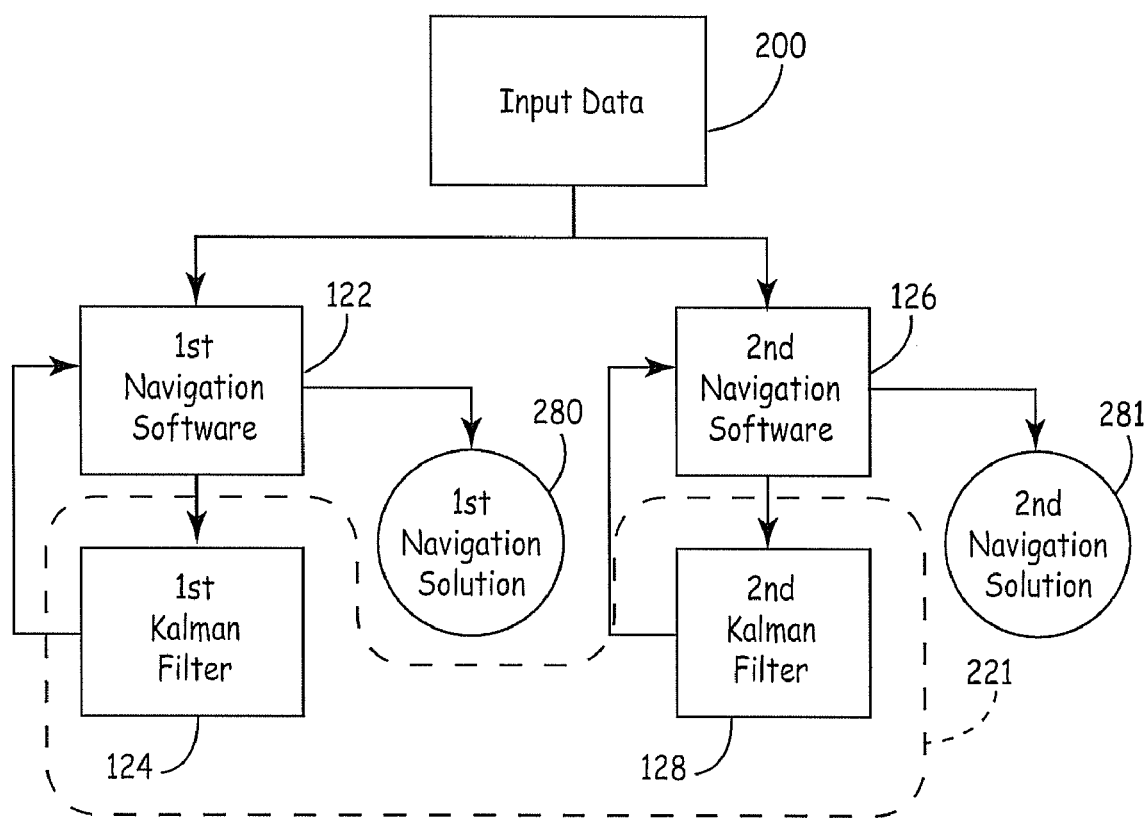
FIG. 7 is a logic diagram of one embodiment of a portion of the fine alignment phase of a gyrocompass alignment.

FIG. 6 is a flow diagram of one embodiment of a method 600 of aligning a gyrocompass in an inertial navigation unit 100. The particular embodiment of method 600 shown in FIG. 6 is described here as being implemented using the inertial navigation unit 100 described above with reference to FIG. 1A. The processing of method 600 is described with reference to the logic diagrams of FIG. 7. The logic diagram of FIG. 7 illustrates the operation of the processing associated with blocks 604 and 606 for a fine alignment of a gyrocompass in the inertial measurement unit. The method 600 differs from method 300 of FIG. 3 in that a subset of Kalman filters are selected for operation during the fine alignment phase. Block 602 is a modification of block 304 as described above with reference to method 300 of FIG. 3.

At block 602, the seventh software 119 executing on programmable navigation processor 150 determines a subset of Kalman filters. During coarse alignment, the seventh software 119 determines which error corrections from the set of Kalman filters 230 are smaller or smallest. The seventh software 119 then selects more than Kalman filters from the set of Kalman filters 230 that generated the smaller or smallest error corrections to form a subset of Kalman filters. As shown in FIG. 7, the first Kalman filter 124 and the second Kalman filter 128 form a subset of Kalman filters 221 also referred to here as "subset 221," taken from the set of Kalman filters 230. The Kalman filters in the subset 221 output smaller error corrections than the Kalman filters not in the subset 221. Thus according to the implementation shown in FIG. 7, the first Kalman filter 124 and second Kalman filter 128, in the subset 221 output smaller error corrections than the third Kalman filter 132 (FIG. 1). In one implementation of this embodiment, the error corrections include measurement residuals and estimated-convergent-parameter errors. In one implementation of this embodiment, the estimated-convergent-parameter error is an estimated-azimuth error.

At block 604, the navigation software executing on the programmable navigation processor 150 operates the subset of Kalman filter 221 as the selected Kalman filter 225. In the exemplary implementation shown in the logic diagram of FIG. 7, the first navigation software 122 executing on the programmable navigation processor 150 operates the first Kalman filter 124 to generate an error correction for the first navigation solution 280. As is also shown by the logic diagram in FIG. 7, the second navigation software 126 executing on the programmable navigation processor 150 operates the second Kalman filter 128 to generate an error correction for the second navigation solution 281.

At block 606, the inertial measurement unit 100 terminates operation of any Kalman filter that is not in the subset 221. Thus, the third navigation software 130 stops executing on the programmable navigation processor 150 to operate the third Kalman filter 132. In this manner, the inertial measurement unit 100 terminates operation of the third Kalman filter 132, which is not in the subset 221.

In another implementation of this embodiment, the selected navigation solution at the completion of the fine-alignment phase is a linear combination of the selected subset of navigation solutions, rather than the output of a single navigation solution. This linear combination optimizes for situations when the true azimuth lies midway between the initial azimuth of navigation solution 122 and navigation solution 126. The linear combination is based on the size of the initialization error, with greater emphasis on the solution with smaller initialization error as determined by the navigation solution Kalman filters. In this case, the seventh software 119 would be responsible for forming the combined solution.

Figure 8:
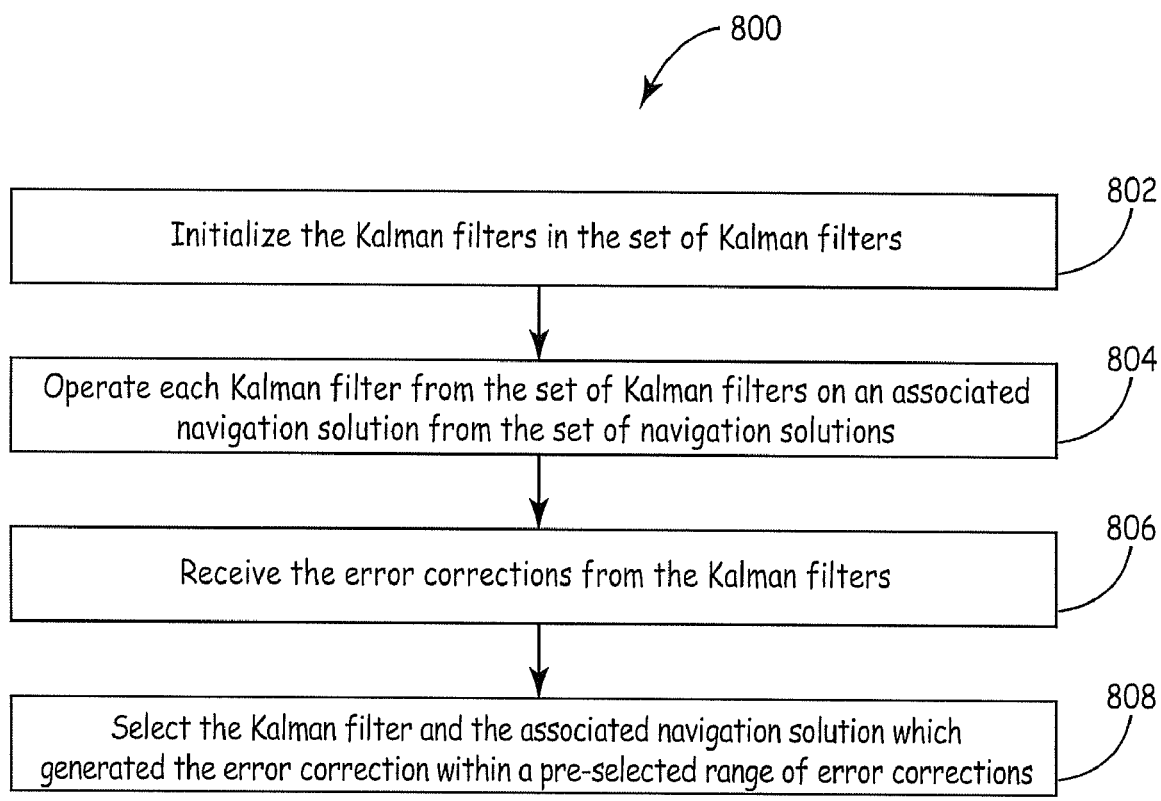
FIG. 8 is a flow diagram of one embodiment of a method of aligning a gyrocompass in an inertial navigation unit.
Figure 9:
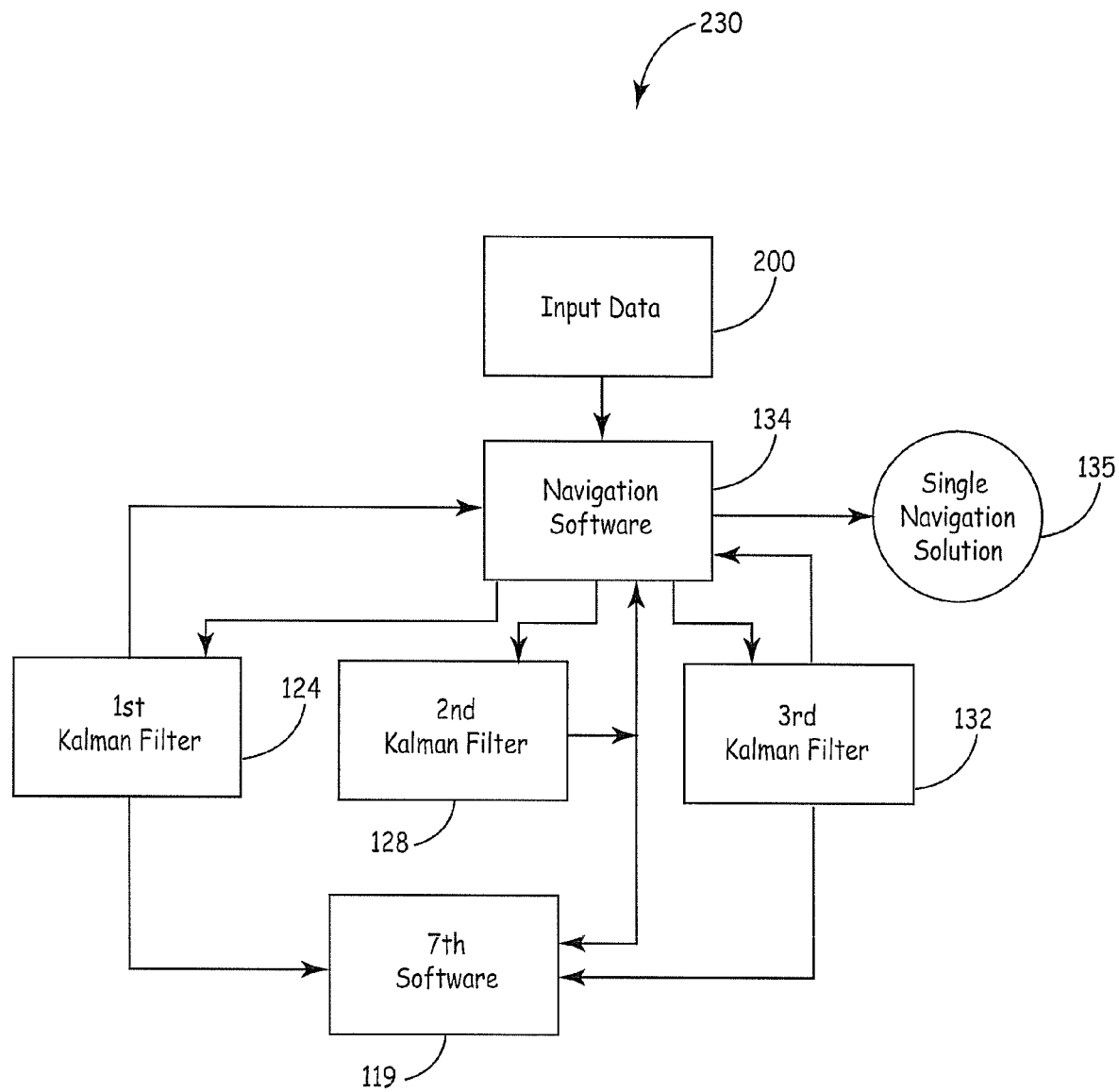
FIG. 9 is a logic diagram of one embodiment of a coarse alignment phase of a gyrocompass alignment.
Figure 10:
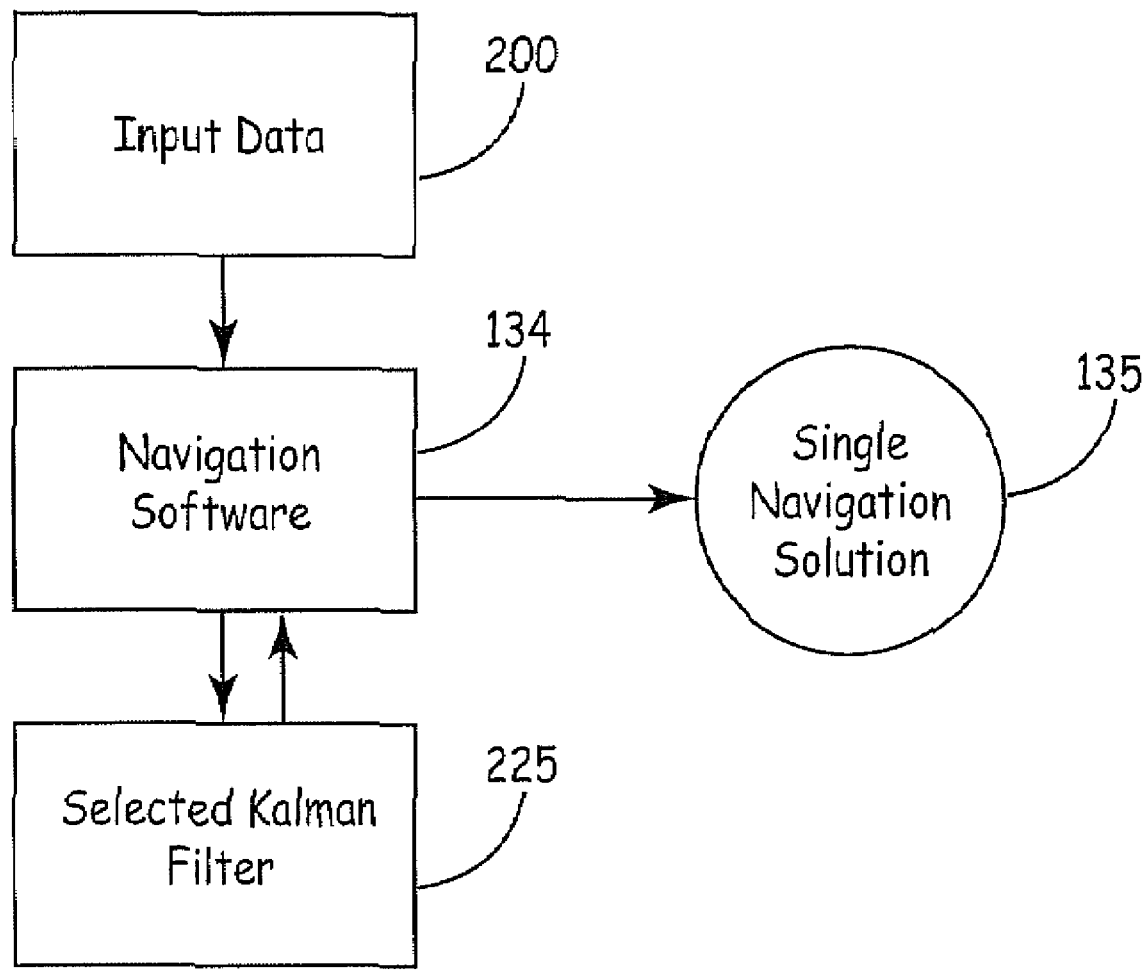
FIG. 10 is a logic diagram of one embodiment of a portion of the fine alignment phase of a gyrocompass alignment.

FIG. 8 is a flow diagram of one embodiment of a method 800 of aligning a gyrocompass in an inertial navigation unit 100. The particular embodiment of method 800 shown in FIG. 8 is described here as being implemented using the inertial navigation unit 100 described above with reference to FIG. 1A in which the set of navigation solutions 240 comprises a single navigation solution 135 (FIG. 9). The processing of method 800 is described with reference to the logic diagrams of FIGS. 9-10. The logic diagram of FIG. 9 illustrates the operation of the processing associated with block 804 for a coarse alignment of a gyrocompass. The logic diagram of FIG. 10 illustrates the operation of the processing associated with block 808 for a fine alignment of the gyrocompass. The method 800 differs from method 300 in FIG. 3 in that the set of navigation solutions 240 is a single navigation solution that receives error corrections from the set of Kalman filters 230 (FIG. 1) during the coarse alignment of the inertial measurement unit 100. In this implementation, each Kalman filter is initialized with a different azimuth error assumption and the separation in the azimuth error assumptions of the Kalman filters is small enough that each Kalman filter can make a small angle error assumption. Additionally, the magnitude of the initial azimuth error assumption is controlled by the magnitude of separation in the initial azimuth error. In one implementation of this embodiment, there are thirty-six (36) Kalman filters that are generally represented by first Kalman filter 124, second Kalman filter 128 and third Kalman filter 132 in FIG. 9. In another implementation of this embodiment, there are 60 Kalman filters that are generally represented by first Kalman filter 124, second Kalman filter 128 and third Kalman filter 132 in FIG. 9.

At block 802, the inertial measurement unit 100 initializes the Kalman filters 124, 128 and 132 in the set of Kalman filters 230. In order to initialize the Kalman filters 124, 128, the seventh software 119 executing on the programmable navigation processor 150 sets the azimuth error assumption for each Kalman filter so that each Kalman filter 124, 128 and 132 includes an azimuth error assumption different from the azimuth error assumption of each other Kalman filter 124, 128 and 132. In one implementation of this embodiment, the azimuth error assumptions are stored in the memory 135. The Kalman filter error states are initialized so that small angle error assumptions can be maintained for at least one Kalman filter.

At block 804, the inertial measurement unit 100 operates each Kalman filter from the set of Kalman filters on an associated navigation solution from the set of navigation solutions. FIG. 9 is a logic diagram of one embodiment of a coarse alignment phase of a gyrocompass alignment according to method 800 in which the associated navigation solution from the set of navigation solutions is a single navigation solution 135 unlike the logic diagram in FIG. 4. As shown in FIG. 9, the navigation software 134 receives the input data 200. The navigation software 134 executing on the programmable navigation processor 150 operates the first Kalman filter 124 to generate an error correction for the single navigation solution 135, operates the second Kalman filter 128 to generate an error correction for the single navigation solution 135 and operates the third Kalman filter 132 to generate an error correction for the single navigation solution 135. The seventh software selects which Kalman filters error correction will be applied to the single navigation solution. This selection is based on an initial assumption and then on the error statistics of the Kalman filter.

The method described in FIG. 8 and FIG. 9 is mathematically more complex than the method described in FIGS. 1, 3, and 4 because the Kalman filter processing must account for the propagation of errors through the initial azimuth error assumption.

At block 806, the navigation software 134 receives the error corrections from Kalman filters in the set of Kalman filters 230. As shown in FIG. 9, the seventh software 119 also receives the error corrections. The seventh software 119 executing on the programmable navigation processor 150 determines which, if any, of the received error corrections fall within a pre-selected range of the error corrections. In one implementation of this embodiment, the pre-selected range of the error corrections is stored in memory 135 (FIG. 1).

At block 808, the seventh software 119 selects the Kalman filter and the associated navigation solution which generated the error correction within a pre-selected range of the error corrections. When a received error correction is determined to fall with the pre-selected range of the error corrections, the seventh software 119 executing on the programmable navigation processor 150 determines which, Kalman filter generated that error correction. In the exemplary case shown in FIG. 9, the associated navigation solution is the single navigation solution 135, regardless of which Kalman filter generated the error correction within a pre-selected range of the error connections.

FIG. 10 is a logic diagram of one embodiment of a portion of the fine alignment phase of a gyrocompass alignment. As shown in FIG. 10, the input data 200 is received at the navigation software 134. The navigation software 134 executing on the programmable navigation processor 150 operates the selected Kalman filter 225 to generate an error correction for the single navigation solution 135. The selected Kalman filter 225 had generated an error correction within a pre-selected range of error corrections so the fine alignment phase is reached before it would have been reached with a single Kalman filter in the inertial navigation unit 100. By operating the set of Kalman filter 230, the alignment phase of the gyrocompass in the inertial measurement unit 100 is shortened since each Kalman filter acts as a fine-alignment Kalman filter.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be preformed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory.

Storage devices suitable for tangibly embodying computer program instructions and data include all form of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of aligning a gyro-compass, the method including:
   operating at least two Kalman filters in a set of Kalman filters to generate an error correction to at least a single navigation solution in a set of navigation solutions to provide coarse alignment azimuth convergence;
   selecting at least one Kalman filter from the set of Kalman filters and at least one navigation solution from the set of navigation solutions, wherein the selecting is based at least in part on the generated error correction; and
   operating the at least one selected Kalman filter and the at least one selected navigation solution to provide fine alignment convergence to a correct azimuth,
   wherein each navigation solution includes an azimuth different from the azimuth of each other navigation solution; and
   wherein each navigation solution azimuth is separated by no more than two times a small angle error assumption.

2. The method of claim 1, the method further comprising:
   initializing the Kalman filters in the set of Kalman filters;
   operating each Kalman filter from the set of Kalman filters on an associated navigation solution from the set of navigation solutions;
   receiving the error corrections from the Kalman filters; and
   selecting the Kalman filter and the associated navigation solution which generated the error correction within a pre-selected range of error corrections.

3. The method of claim 2, wherein the set of navigation solutions comprises a single navigation solution and wherein each Kalman filter from the set of Kalman filters operates on the single navigation solution.

4. The method of claim 1, where the selected navigation solution and the selected Kalman filter are formed from a linear combination of at least two navigation solutions and at least two Kalman filters, respectively.

5. The method of claim 1, further comprising operating each Kalman filter in the set of Kalman filters to provide coarse alignment convergence to within the small angle error assumption.

6. The method of claim 1, wherein initial azimuth error assumptions for the Kalman filters in the set of Kalman filters are uniformly distributed within 360°.

7. The method of claim 1, wherein an initial azimuth error assumption for each Kalman filter in the set of Kalman filters is one of: separated by no more than two times the small angle error assumption; initialized for less than about one half of an angle separating the Kalman filters; and separated by no more than two times the small angle error assumption and initialized for less than about one half of an angle separating the Kalman filters.

8. The method of claim 1, wherein the error correction comprises a measurement residual and an estimated azimuth error and wherein selecting at least one selected Kalman filter comprises:
   selecting at least one Kalman filter that outputs at least one of a smaller measurement residual and a smaller estimated-azimuth error.

9. The method of claim 1, wherein selecting one of the set of Kalman filters comprises:
   determining a subset of Kalman filters taken from the set of Kalman filters wherein the Kalman filters in the subset output smaller error corrections than the Kalman filters not in the subset;
   operating the subset of Kalman filters as the selected Kalman filter; and
   terminating the operation of the Kalman filters not in the subset of Kalman filters.

10. An inertial navigation unit comprising:
    at least one sensor to provide input data;
    at least two Kalman filters communicatively coupled to the at least one sensor;
    wherein the inertial navigation system generates at least a single navigation solution based at least in part on the input data using the at least two Kalman filters;
    wherein the inertial navigation system terminates the operation of one or more Kalman filter based on at least in part measurement residuals and estimated-convergent-parameter errors received from each Kalman filter, wherein the inertial navigation system operates at least one of a selected Kalman filter and a selected navigation solution to provide fine alignment convergence to a convergent parameter.

11. The inertial navigation unit of claim 10, wherein each Kalman filter includes an azimuth error assumption different from the azimuth error assumption of each of the other Kalman filters.

12. The inertial navigation unit of claim 10, wherein each navigation solution includes an azimuth error initialization different from the azimuth error initialization of each of the other navigation solutions.

13. The inertial navigation unit of claim 10, wherein the convergent parameter is an azimuth parameter and the estimated-convergent-parameter error is an estimated-azimuth error.

14. The inertial navigation unit of claim 10, wherein the at least one sensor comprises:
    at least one inertial sensor to provide inertial data; and
    at least one data sensor to provide observation data, wherein the inertial data and the observation data comprise the input data.

15. The inertial navigation unit of claim 10, wherein the at least two Kalman filters comprise at least thirty-six Kalman filters, wherein the at least one navigation solution comprises at least thirty-six navigation solutions, wherein the number of Kalman filter equals the number of navigation solutions, and wherein the at least one of the selected Kalman filter and the selected navigation solution provide azimuth convergence to the required accuracy level, wherein a completion time for a gyrocompass alignment to the required accuracy level is reduced.

16. The inertial navigation unit of claim 15, wherein each Kalman filter includes an azimuth error assumption different from the azimuth error assumption of each of the other Kalman filters.

17. The inertial navigation unit of claim 15, wherein each navigation solution includes an initial azimuth different from the initial azimuth of each of the other navigation solutions.

18. The inertial navigation unit of claim 10, wherein the at least two Kalman filters comprise at least thirty-six Kalman filters, wherein each Kalman filter includes an azimuth error assumption different from the azimuth error assumption of each of the other Kalman filters, wherein the at least one navigation solution comprises one navigation solution, wherein the one navigation solution is the selected navigation solution, and wherein the selected Kalman filter and the selected navigation solution provide azimuth convergence to the required accuracy level, wherein a completion time for a gyrocompass alignment to the required accuracy level is reduced.

19. A program product comprising program instructions, embodied on a storage medium, that are operable to cause a programmable processor to:

operate at least two Kalman filters in a set of Kalman filters to generate an error correction to at least a single navigation solution in a set of navigation solutions to provide azimuth convergence;

select at least one selected Kalman filter from the set of Kalman filters and at least one selected navigation solution from the set of navigation solutions, wherein the selecting is based at least in part on the generated error correction; and operate the at least one selected Kalman filter and the at least one selected navigation solution to provide azimuth convergence to the required accuracy level, wherein a completion time for a gyrocompass alignment to the required accuracy level is reduced.

20. The program product of claim 19, further comprising instructions operable to cause the programmable processor to:

initialize the Kalman filters in the set of Kalman filters;

operate each Kalman filter from the set of Kalman filters on an associated navigation solution from the set of navigation solutions;

receive the error corrections from the Kalman filters; and select the Kalman filter and the associated navigation solution which generated the error correction within a preselected range of error corrections.

* * * * *